United States Patent
Thomas et al.

(10) Patent No.: US 10,949,659 B2
(45) Date of Patent: Mar. 16, 2021

(54) VEHICLE OCCUPANT DETECTION

(71) Applicant: GM GLOBAL TECHNOLOGY OPERATIONS LLC, Detroit, MI (US)

(72) Inventors: Scott D. Thomas, Novi, MI (US); Chad M. O'Brien, Shelby Township, MI (US); Dorel M. Sala, Troy, MI (US); Tricia E. Morrow, Grosse Pointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 16/385,777

(22) Filed: Apr. 16, 2019

(65) Prior Publication Data

US 2020/0334453 A1 Oct. 22, 2020

(51) Int. Cl.
*G06K 9/00* (2006.01)
*B60R 25/31* (2013.01)
*B60R 21/015* (2006.01)
*B60N 2/00* (2006.01)

(52) U.S. Cl.
CPC ......... *G06K 9/00369* (2013.01); *B60N 2/002* (2013.01); *B60R 21/01526* (2014.10); *B60R 25/31* (2013.01)

(58) Field of Classification Search
CPC ... B60R 21/01552; B60R 22/48; B60R 25/25; G07C 9/37; A61B 8/02
See application file for complete search history.

(56) References Cited

U.S. PATENT DOCUMENTS

| | | | | |
|---|---|---|---|---|
| 2006/0283652 | A1* | 12/2006 | Yanai | G08B 21/06 180/272 |
| 2014/0039330 | A1* | 2/2014 | Seo | A61B 5/02 600/509 |
| 2014/0276090 | A1* | 9/2014 | Breed | A61B 5/14546 600/473 |
| 2014/0303899 | A1* | 10/2014 | Fung | G06F 19/36 702/19 |
| 2016/0249191 | A1* | 8/2016 | Avrahami | H04W 4/12 |

OTHER PUBLICATIONS

U.S. Appl. No. 15/847,044, filed Dec. 19, 2017, 18 pages.

* cited by examiner

*Primary Examiner* — Mirza F Alam
(74) *Attorney, Agent, or Firm* — Lorenz & Kopf, LLP

(57) ABSTRACT

A system and method for detecting an occupant within a seat of a vehicle. The method includes: obtaining onboard sensor data from at least one occupant detection sensor, wherein the at least one occupant detection sensor is a biometric sensor, and wherein the onboard sensor data includes data extracted from a sensor response of the biometric sensor; determining an occupant presence classification selected from a plurality of occupant presence classifications based on an evaluation of the onboard sensor data, wherein the evaluation is carried out using occupant detection sensor parameters in combination with the onboard sensor data, and wherein the plurality of occupant presence classifications include an occupant not present classification, an occupant spaced away from seat classification, and an occupant directly on seat classification; and carrying out a vehicle action in response to the determined occupant presence classification.

20 Claims, 8 Drawing Sheets

VEHICLE OCCUPANT DETECTION

INTRODUCTION

The present invention relates to detecting and classifying the presence of an occupant within a vehicle seat.

Vehicles include hardware and software capable of obtaining and processing various information, including information that is obtained by onboard vehicle sensors. These onboard vehicle sensors can include occupant detection sensors. The vehicle can carry out or enable different functionality based on whether an occupant is detected within a vehicle seat.

SUMMARY

According to one aspect of the invention, there is provided a method of detecting an occupant within a seat of a vehicle. The method includes: obtaining onboard sensor data from at least one occupant detection sensor, wherein the at least one occupant detection sensor is a biometric sensor, and wherein the onboard sensor data includes data extracted from a sensor response of the biometric sensor; determining an occupant presence classification selected from a plurality of occupant presence classifications based on an evaluation of the onboard sensor data, wherein the evaluation is carried out using occupant detection sensor parameters in combination with the onboard sensor data, and wherein the plurality of occupant presence classifications include an occupant not present classification, an occupant spaced away from seat classification, and an occupant directly on seat classification; and carrying out a vehicle action in response to the determined occupant presence classification.

According to various embodiments, this method may further include any one of the following features or any technically-feasible combination of some or all of these features:

- wherein the method further comprises: receiving an occupant detection system initiation signal, wherein the obtaining step is carried out in response to the receiving step, and wherein the occupant detection system initiation signal is at least one of (a) a signal indicating that the vehicle has transitioned from a primary propulsion off state to a primary propulsion on state, (b) a signal indicating that the vehicle is moving or has stopped moving or is in a parked state, (c) an occupant signal to initiate a ride, and (d) a door closed message;
- the biometric sensor is positioned in the seat such that, when a child restraint is placed on a top surface of a base portion of the seat, the child restraint is disposed between the biometric sensor and an occupant seating location within the child restraint;
- the obtaining step further comprises receiving a negligible response as the sensor response from the biometric sensor which indicates that an occupant is not present within the seat such that the occupant presence classification is determined to be the occupant not present classification;
- the sensor response of the biometric sensor is considered a weak response indicates that an occupant is present within a child restraint on the seat such that the occupant presence classification is determined to be the occupant spaced away from seat classification;
- the sensor response of the biometric sensor is considered a strong response indicates that an occupant is present directly on a top surface of a base portion of the seat such that the occupant presence classification is determined to be the occupant directly on seat classification;
- the sensor response of the biometric sensor is evaluated by comparing the onboard sensor data to a first threshold, wherein the first threshold is obtained from the occupant detection sensor parameters, wherein the first threshold is used to distinguish between the weak response and a strong response, wherein it is determined that the occupant presence classification is the occupant spaced away from seat classification when the sensor response is determined to be the weak response, and wherein it is determined that the occupant presence classification is the occupant directly on seat classification when the sensor response is determined to be the strong response;
- the sensor response of the biometric sensor is evaluated by comparing the onboard sensor data to a second threshold, wherein the second threshold is obtained from the occupant detection sensor parameters, wherein the second threshold is used to distinguish between a negligible response and a weak response, wherein it is determined that the occupant presence classification is the occupant not present classification when the sensor response is determined to be the negligible response, and wherein it is determined that the occupant presence classification is the occupant spaced away from seat classification when the sensor response is determined to be the weak response;
- the at least one occupant detection sensor includes a second occupant detection sensor in addition to the biometric sensor;
- the onboard sensor data from the second occupant detection sensor is used to determine if an object is present;
- when an object is detected in the seat and the occupant presence classification is determined to be the occupant not present classification, then providing a warning via one or more vehicle-user interfaces;
- the biometric sensor is a piezoelectric sensor, a heartbeat sensor, or a breathing rate sensor;
- the biometric sensor is a Freer type sensor or a Plessey Epic sensor;
- an occupant status is provided to a non-vehicle device, and wherein the occupant status indicates the determined occupant presence classification; and/or
- the method is carried out as a part of an intrusion detection process and, when an intruder is detected using the intrusion detection process, then notifying a designated vehicle user or law enforcement authority.

According to another aspect of the invention, there is provided a method of detecting an occupant within a seat of a vehicle. The method includes: receiving an occupant detection system initiation signal with vehicle electronics of the vehicle; in response to receiving the occupant detection system initiation signal, obtaining onboard sensor data from at least one occupant detection sensor, wherein the at least one occupant detection sensor is a biometric sensor, and wherein the onboard sensor data includes data extracted from a sensor response of the biometric sensor; determining a zone of a plurality of zones with respect to the seat in which an occupant was detected based on analyzing the sensor response or onboard sensor data to determine a range of the sensor response, wherein the plurality of zones includes a first zone that includes a region encompassing a top surface of a bottom portion of the seat and a second zone that is disposed over the first zone such that the first zone is disposed between the second zone and the top surface of the bottom portion of the seat; determining an occupant presence classification selected from a plurality of occupant presence classifications based on the determined zone, wherein the plurality of occupant presence classifications include an occupant not present classification, an occupant spaced away from seat classification, and an occupant directly on seat classification, wherein the occupant presence classification is determined to be the occupant directly on seat classification when the determined zone is the first zone, and wherein the occupant presence classification is determined to be the occupant spaced away from seat classification when the determined zone is the second zone; and carrying out a vehicle action in response to the determined occupant presence classification.

This method can further include at least one of: communicating a message and taking a ride action as an outcome of the occupant presence classification.

According to another aspect of the invention, there is provided an occupant detection system, including: at least one occupant detection sensor installed in a vehicle seat of a vehicle, wherein the at least one occupant detection sensor includes a biometric sensor, and wherein the sensor detection range of the biometric sensor includes an area in which an occupant resides when properly seated within the vehicle seat; and an onboard computer that includes a processor and memory, wherein the onboard computer is communicatively coupled to the at least one occupant detection sensor, and wherein the memory includes occupant detection sensor parameters; wherein the occupant detection system is configured to: (i) obtain onboard sensor data from the at least one occupant detection sensor, wherein the onboard sensor data includes data extracted from a sensor response of the biometric sensor; (ii) determine an occupant presence classification selected from a plurality of occupant presence classifications based on an evaluation of the onboard sensor data, wherein the evaluation is carried out using the occupant detection sensor parameters in combination with the onboard sensor data, and wherein the plurality of occupant presence classifications include an occupant not present classification, an occupant spaced away from seat classification, and an occupant directly on seat classification; and (iii) carry out a vehicle action in response to the determined occupant presence classification.

According to various embodiments, this occupant detection system may further include any one of the following features or any technically-feasible combination of some or all of these features:

- the at least one occupant detection sensor includes a second biometric sensor that is installed in the vehicle seat of the vehicle, and wherein the sensor detection range of the second biometric sensor includes an area in which an occupant resides when properly seated within the vehicle seat; and/or
- the at least one occupant detection sensor is installed within a bottom portion of the vehicle seat of the vehicle, and wherein the field of view of each of the at least one occupant detection sensor is directed upward in a direction that is substantially orthogonal to a top surface of the bottom portion of the vehicle seat.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables detection of an occupant within a seat of a vehicle. The system and method can include or use at least one biometric sensor to detect an occupant within a vehicle seat. The at least one biometric sensor can be installed within or in close proximity of a bottom portion of the vehicle seat and can face an area in which an occupant resides when seated properly in the vehicle seat. According to at least some embodiments, the biometric sensor can be an electromagnetic or electric field sensor, or may be an acoustic sensor. The sensor response can be evaluated using occupant detection sensor parameters to determine an occupant presence classification in addition to determining whether an occupant is present. The occupant detection sensor parameters can be developed through an empirical process in which sensor responses from the occupant detection sensor (or similar sensors) are analyzed to extract information that indicates the presence of an occupant directly on the seat or spaced away from the seat (e.g., in a child restraint), as well as information that indicates no occupant is present. In at least one embodiment, a range finding approach can be used in which a range (or distance) between the occupant detection sensor and the detected object (or the object that reflected the sensor signals) can be determined. This range can be determined using various approaches, such as based on a sensor signal time of flight, which is the time between transmitting the sensor signals and receiving the sensor response (or reflected sensor signals) at the receiver of the occupant detection sensor. This range can also be determined, for example, by the signal strength of the received response (or reflected sensor signals) or the phase difference between the transmitted and reflected signal.

Figure 1:
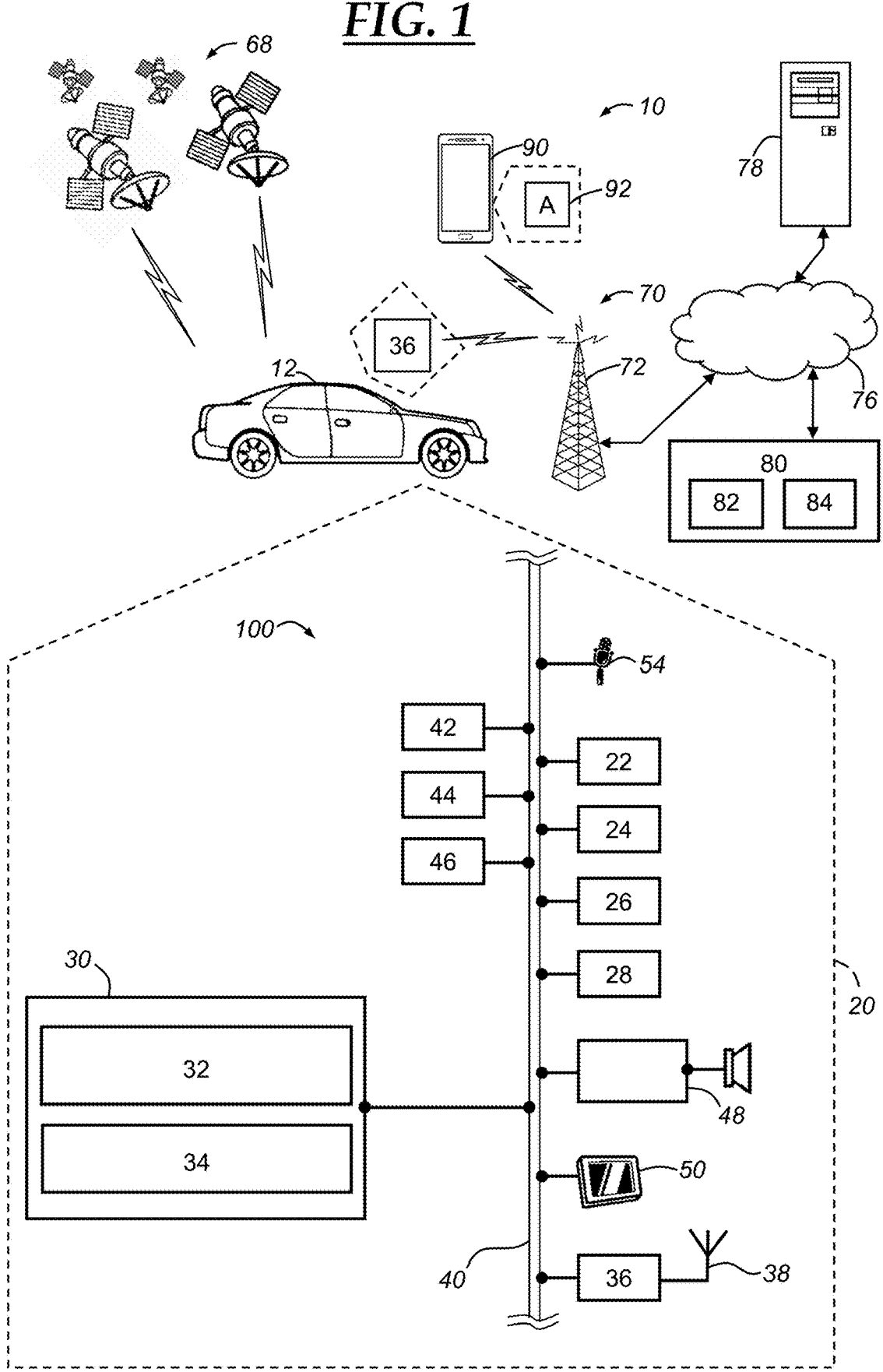
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with an occupant detection system 100, a constellation of global navigation satellite system (GNSS) satellites 68, one or more wireless carrier systems 70, a land communications network 76, a remote computer (or server) 78, a backed vehicle services facility 80, and a handheld wireless device (HWD) 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., telematics unit 36 of the vehicle 12, HWD 90). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to the remote computer 78 and/or the vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Remote server (or computer) 78 (referred to collectivity as "remote server") (only one shown) can include any of a number of servers or computers accessible via a private or public network such as the Internet. In one embodiment, each such remote server 78 can be used for one or more purposes, such as for providing a vehicle user computer application that allows a user to access vehicle information and/or control certain vehicle functionality. In one embodiment, the remote server 78 can support (e.g., act as a server for) a vehicle user computer application 92 that is carried out by the HWD 90. Additionally or alternatively, such accessible remote servers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, backend facility 80, or both.

Vehicle backend services facility 80 is a remote facility and is located at a physical location that is located remotely from the vehicle 12. The vehicle backend services facility 80 (or "backend facility 80" for short) may be designed to provide the vehicle electronics 20 with a number of different system back-end functions through use of one or more electronic servers 82. In one embodiment, the backend facility 80 provides vehicle information to a vehicle user computer application and/or facilitates remote communications between the vehicle user computer application and the vehicle. In one embodiment, the backend facility 80 can support (e.g., act as a server for) a vehicle user computer application 92 that is carried out by the HWD 90. The vehicle backend services facility 80 includes vehicle back-end services servers 82 and databases 84, which may be stored on a plurality of memory devices. The vehicle backend services facility 80 may include any or all of these various components and, in at least some embodiments, each of the various components are coupled to one another via a wired or wireless local area network. The backend facility 80 may receive and transmit data via a modem connected to the land network 76. Data transmissions may also be conducted by wireless systems, such as IEEE 802.11x, GPRS, and the like. Those skilled in the art will appreciate that, although only one backend facility 80 and one remote server 78 are depicted in the illustrated embodiment, numerous backend facilities 80 and/or remote servers 78 may be used. Moreover, a plurality of backend facilities 80 and/or remote servers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services, such as the carrying out of one or more method steps as discussed below. This software may be stored in computer-readable memory, which can include or be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. The backend facility 80 can include a number of routers, modems, switches, or other network devices that can be used to provide networking capabilities, such as connecting with the land network 76 and/or the cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. One or more databases at the backend facility 80 can store various information and can include vehicle location monitoring information, which can include locations (e.g., geographical locations) of various vehicles at different times so as to track and/or monitor the location of such vehicles. The databases 84 can also store occupant detection sensor information, such as occupant detection sensor parameters. The occupant detection sensor parameters, which will be discussed more below, can be used by the occupant detection system 100 of the vehicle 12 to classify the occupant presence.

The handheld wireless device (HWD) 90 is a mobile device and a SRWC device (i.e., a device capable of SRWC) and may include: hardware, software, and/or firmware enabling cellular telecommunications and SRWC as well as other mobile device applications, such as a vehicle user computer application 92. The hardware of the HWD 90 may comprise: a processor and memory for storing the software, firmware, etc. The HWD processor and memory may enable various software applications, which may be preinstalled or installed by the user (or manufacturer) (e.g., having a software application or graphical user interface (GUI)). In one embodiment, the HWD 90 includes a vehicle user computer application 92 that enables a vehicle user to communicate with the vehicle 12 (e.g., such as inputting route or trip parameters) and/or control various aspects or functions of the vehicle, some of which are listed above. Additionally, one or more applications may allow the user to connect with the backend facility 80 or call center advisors.

In one particular embodiment, the HWD 90 can be a personal cellular SRWC device that includes a cellular chipset and/or cellular connectivity capabilities, as well as SRWC capabilities. Using a cellular chipset, for example, the HWD can connect with various remote devices, including remote servers 78 and the servers 82 of the backend facility 80 via wireless carrier system 70 and/or land network 76. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. In some embodiments, the HWD 90 is a personal SRWC device.

The processor of the HWD 90 can be any type of device capable of processing electronic instructions including microprocessors, microcontrollers, host processors, controllers, vehicle communication processors, and application specific integrated circuits (ASICs). The processor executes various types of digitally-stored instructions, such as software or firmware programs stored in memory of the HWD 90, which enable the device 90 to provide a wide variety of functionality. For instance, in one embodiment, the processor can execute programs (e.g., vehicle user computer application 92) and/or process data. In some embodiments, the HWD 90 can be a smartphone or tablet that includes an operating system, such as Android™, iOS™, Microsoft Windows™, and/or other operating systems. The memory of the HWD 90 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives.

The HWD 90 can also include a short range wireless communications (SRWC) circuit and/or chipset as well as one or more antennas, which allows it to carry out SRWC, such as any of the IEEE 802.11 protocols, Wi-Fi™, WiMAX™, ZigBee™, Wi-Fi Direct™ Bluetooth™, or near field communication (NFC). The SRWC circuit and/or chipset may allow the HWD 90 to connect to another SRWC device, such as a SRWC device of the vehicle 12, which can be a part of an infotainment unit or a part of the telematics unit 36. Additionally, as mentioned above, the HWD 90 can include a cellular chipset thereby allowing the device to communicate via one or more cellular protocols, such as GSM/GPRS technology, CDMA or CDMA2000 technology, and LTE technology. The HWD 90 may communicate data over wireless carrier system 70 using the cellular chipset and an antenna.

The vehicle user computer application 92 is an application that enables the user to view information pertaining to the vehicle 12. In some embodiments, the vehicle user computer application 92 enables the user to send commands to the vehicle, such as to remotely start the vehicle's engine (or other primary propulsion system), to lock/unlock vehicle doors, etc. The vehicle user computer application 92 can also enable the user to view status information concerning the vehicle, such as the status of occupancy of one or more vehicle seats of the vehicle 12.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, public transportation vehicles, etc., can also be used. Some of the vehicle electronics 20 are shown generally in FIG. 1 and includes a global navigation satellite system (GNSS) receiver 22, a body control module or unit (BCM) 24, an engine control module or unit (ECM) 26, a restraint system 28, an onboard computer 30, a telematics unit 36, occupant sensors 42-46, audio system 48, a display 50, and microphone(s) 52. Some or all of the different vehicle electronics may be connected for communication with each other via one or more communication busses, such as communications bus 40. The communications bus 40 provides the vehicle electronics 20 with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of vehicle electronics 20, such as the GNSS receiver 22, the BCM 24, the ECM 26, the restraint system 28, the onboard computer 30, the telematics unit 36, occupant sensors 42-46, audio system 48, the display 50, and microphone(s) 54, which will be described in detail below. The vehicle 12 can also include other VSMs in the form of electronic hardware components that are located throughout the vehicle and, which may receive input from one or more sensors and use the sensed input to perform diagnostic, monitoring, control, reporting, and/or other functions. Each of the VSMs can be connected by the communications bus 40 to the other VSMs. One or more VSMs may periodically or occasionally have their software or firmware updated and, in some embodiments, such vehicle updates may be over the air (OTA) updates that are received from the remote server 78 or the backend facility 80 via land network 76, cellular carrier system 70, and telematics unit 36, for example. As is appreciated by those skilled in the art, the above-mentioned VSMs are only examples of some of the modules that may be used in vehicle 12, as numerous others are also possible.

The global navigation satellite system (GNSS) receiver 22 receives radio signals from a constellation of GNSS satellites 68. The GNSS receiver 22 can be configured to comply with and/or operate according to particular regulations or laws of a given region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 68. And, in another example, GNSS receiver 22 can be a BDS receiver that receives a plurality of GNSS (or BDS) signals from a constellation of GNSS (or BDS) satellites 68. The GNSS receiver 22 can include at least one processor and memory, including a non-transitory computer readable memory storing instructions (software) that are accessible by the processor for carrying out the processing performed by the receiver 22. In one embodiment, the vehicle location can be determined through the GNSS receiver 22 and reported to a remote server, such as the servers 82 at the backend facility 80 and/or the remote server 78.

The body control module (BCM) 24 can be used to control various VSMs of the vehicle, as well as obtain information concerning the VSMs, including their present state or status, as well as onboard sensor data. The BCM 24 is shown in the exemplary embodiment of FIG. 1 as being electrically coupled to the communication bus 40. In some embodiments, the BCM 24 may be integrated with or part of a center stack module (CSM), infotainment unit, the onboard computer 30, or other VSMs. Or, the BCM may be a separate device that is connected to other VSMs via the communications bus 40. The BCM 24 can include a processor and/or memory, which can be similar to processor 32 and memory 34 of the onboard computer 30, as discussed below. The BCM 24 may communicate with the onboard computer 30 and/or one or more vehicle system modules, such as the engine control module (ECM) 26 and/or the telematics unit 36. Software stored in the memory and executable by the processor enables the BCM 24 to direct one or more vehicle functions or operations including, for example, controlling central locking, air conditioning, power mirrors, controlling the vehicle primary mover (e.g., engine, primary propulsion system), and/or controlling various other vehicle modules.

The engine control module (ECM) 26 may control various aspects of engine operation such as fuel ignition and ignition timing. The ECM 26 is connected to the communications bus 40 and may receive operation instructions (or vehicle commands) from the BCM 24 or other vehicle system modules, such as the onboard computer 30 or other VSMs. In one scenario, the ECM 26 may receive a command from the BCM 24 (or other VSM) to place the vehicle in a primary propulsion on state (from a primary propulsion off state)—i.e., initiate the vehicle ignition or other primary propulsion system (e.g., a battery powered motor). In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information). A primary propulsion off state refers to a state in which the primary propulsion system of the vehicle is off, such as when the internal combustion engine is not running or idling, when a vehicle key is not turned to a START or ON (or accessory) position, or when the power control system for one or more electric motors of an electric vehicle is powered off or not enabled. A primary propulsion on state is a state that is not a primary propulsion off state.

Additionally, the BCM 24 and/or the ECM 26 may provide vehicle state information corresponding to the vehicle state or of certain vehicle components or systems, including the VSMs discussed herein. For example, the BCM 24 and/or the ECM 26 may provide the onboard computer 30 and/or the telematics unit 36 with information indicating whether the vehicle is in a primary propulsion on state or a primary propulsion off state, battery information from a vehicle battery system, etc. The information can be sent to the onboard computer 30 and/or the telematics unit 36 (or other vehicle computer/controller) automatically upon receiving a request from the device/computer, automatically upon certain conditions being met, upon a request from another VSM, or periodically (e.g., at set time intervals). The BCM 24 and/or the ECM 26 can also be used to detect the presence of a predetermined vehicle operating condition, which can be carried out by (for example) comparing the predetermined vehicle operating condition (or information pertaining thereto) to current vehicle operating conditions (or present vehicle information). The BCM 24 and/or the ECM 26 can then wake-up or otherwise inform the onboard computer 30 and/or the telematics unit 36 of this event. In other embodiments, the onboard computer 30 and/or the telematics unit 36 can carry out this detecting function based on information received from the BCM 24 and/or the ECM 26.

The restraint system 28 includes at least one or more airbags and/or one or more seatbelt pretensioners that are mounted or installed in various portions of the vehicle cabin 110. According to one embodiment, at least one of the airbag(s) and the seatbelt pretensioners can be enabled based on the presence (and/or classification) of an occupant (as detected by occupant detection sensors 42-46) in the associated vehicle seat. The airbag(s) and pretensioner(s) of the restraint system 28 can be controlled by one or more VSMs of the vehicle electronics 20, such as the BCM 24. Various types of airbags and/or airbag systems, as well as pretensioners and/or pretensioner systems can be used for the restraint system 28.

The onboard computer 30 includes a processor 32 and memory 34. The processor 32 can be used for executing various computer instructions, including those that may be stored on memory 34. The onboard computer 30 is shown as being separate from other VSMs; however, in at least some embodiments, the onboard computer 30 can be a part of or integrated with another VSM of the vehicle electronics 20, such as the occupant detection sensors 42-46, the BCM 24, an infotainment unit, a center stack module (CSM), the telematics unit 36, etc. In at least one embodiment, the onboard computer 30 carries out one or more steps of the method discussed below.

The processor 32 is included as a part of the onboard computer 30 and can be any type of device capable of processing electronic instructions including microprocessors, microcontrollers, host processors, controllers, vehicle communication processors, and application specific integrated circuits (ASICs). It can be a dedicated processor used only for onboard computer 30 or can be shared with other vehicle systems. The processor 32 executes various types of digitally-stored instructions, such as software or firmware programs stored in memory 34, which enable the onboard computer 30 to provide a wide variety of services. For instance, the processor 32 can execute programs or process data to carry out at least a part of the method discussed herein. Memory 34 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to the processor 32 and/or memory 34 can be included in the GNSS receiver 22, the BCM 24, the ECM 26, the telematics unit 36, the occupant detection sensors 42-46, and/or various other VSMs that typically include such processing/storing capabilities.

The telematics unit 36 is capable of communicating data via cellular network communications through use of a cellular chipset. In at least one embodiment, the telematics unit 36 includes a cellular chipset, a processor, memory, and one or more antennas 38. In one embodiment, the GNSS receiver 22 is integrated into the telematics unit 36 so that, for example, the GNSS receiver 22 and the telematics unit 36 are directly connected to one another as opposed to being connected via the communications bus 40. However, in other embodiments, the GNSS receiver 22 can be a standalone module or integrated with another VSM.

In one embodiment, the telematics unit 36 may be a standalone module or, in other embodiments, the telematics unit 36 may be incorporated or included as a part of one or more other vehicle system modules, such as a center stack module (CSM), the onboard computer 30, the GNSS receiver 22, BCM 24, the ECM 26, a head unit, an infotainment unit, and/or a gateway module. In some embodiments, the telematics unit 36 can be implemented as an OEM-installed (embedded) or aftermarket device that is installed in the vehicle. In some embodiments, the telematics unit 36 can also include short-range wireless communications (SRWC) functionality, and can include a SRWC circuit. In such an embodiment, the telematics unit 36 can establish a SRWC connection with the HWD 90 so that messages can be communicated between the vehicle 12 and the HWD 90. The communications between the vehicle 12 and the HWD 90 can be facilitated by the vehicle user computer application 92 of associated application, for example.

As mentioned above, the telematics unit 36 includes a cellular chipset thereby allowing the device to communicate via one or more cellular protocols, such as those used by cellular carrier system 70. In such a case, the telematics unit is user equipment (UE) that can attach to cellular carrier system 70 and carry out cellular communications, which can enable the vehicle electronics to connect to the backend facility 80 and/or the remote computer 78. The telematics unit 36 can include a subscriber identity module (SIM) that can be used for enabling cellular communications with the cellular carrier system 70.

The telematics unit 36 may enable vehicle 12 to be in communication with one or more remote networks (e.g., one or more networks at backend facility 80 or remote servers 78) via packet-switched data communication. This packet-switched data communication may be carried out through use of a non-vehicle wireless access point that is connected to a land network via a router or modem. When used for packet-switched data communication such as TCP/IP, the telematics unit 36 can be configured with a static IP address or can be set up to automatically receive an assigned IP address from another device on the network such as a router or from a network address server.

Packet-switched data communications may also be carried out via use of a cellular network that may be accessible by the telematics unit 36. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The vehicle 12 includes various onboard vehicle sensors, including occupant detection sensors 42-46. In many embodiments, the vehicle 12 also include other onboard vehicle sensors that are not shown in the illustrated embodiment and/or explicitly discussed herein. Generally, the onboard vehicle sensors can obtain information (or onboard sensor data) pertaining to either the operating state of the vehicle (the "vehicle operating state") or the environment of the vehicle (the "vehicle environmental state"). The sensor information can be sent to other VSMs, such as the BCM 24, the onboard computer 30, and/or the telematics unit 36. Also, in some embodiments, the onboard sensor data can be sent with metadata, which can include data identifying the sensor (or type of sensor) that captured the onboard sensor data, a timestamp (or other time indicator), and/or other data that pertains to the onboard sensor data, but that does not make up the onboard sensor data itself. The "vehicle operating state" or "vehicle operating conditions" refers to a state of the vehicle concerning the operation of the vehicle, which can include the operation of the primary mover (e.g., a vehicle engine, vehicle propulsion motors) and/or the operation of various VSMs or components of the vehicle. Additionally, the vehicle operating state (or conditions) can include the vehicle state pertaining to mechanical operations of the vehicle or electrical states of the vehicle (e.g., a state informed by sensor information indicating a vehicle door is opened). The "vehicle environmental state" refers to a vehicle state concerning the interior of the cabin and the nearby, exterior area surrounding the vehicle. The vehicle environmental state can include the presence and/or classification of a user or occupant, behavior of a driver, operator, or passenger, as well as traffic conditions, roadway conditions and features, vehicle location, and statuses of areas nearby the vehicle.

In at least some embodiments, any one or more of the onboard vehicle sensors 42-46 can communicate with the vehicle electronics 20 via a direct wired connection (e.g., through directly wiring the sensors to the onboard computer 30 or other VSM). Also, in some embodiments, any one or more of the onboard vehicle sensors 42-46 can communicate with the vehicle electronics 20 via a wireless connection, such as a SRWC connection (e.g., Wi-FI™, Bluetooth™). In such embodiments, these one or more onboard vehicle sensors can include or be coupled to SRWC circuitry, and can communicate with another VSM that also has SRWC circuitry. In one embodiment, the one or more onboard vehicle sensors could be located at a portion of the vehicle that rotates or moves, such as on or within a vehicle seat that can be adjusted by an occupant, or may be installed within a removeable vehicle seat. In such an embodiment, wireless communications may be desirable.

The occupant detection sensors 42-46 are onboard vehicle sensors that are used to capture onboard sensor data and to detect whether an occupant is present in the vehicle cabin 100. The vehicle 12 can include any number of occupant detection sensors, and the occupant detection sensors can be installed in the vehicle 12 at a variety of locations, some of which will be discussed below according to one or more embodiments. The occupant detection sensors 42-46 can include biometric sensors, which are sensors that detect the presence of life or biological material. In the illustrated embodiment, sensors 42-44 are biometric sensors that are installed into a passenger seat 102 (FIG. 2) of the vehicle 12. The occupant detection sensor 46 is a pressure sensor that is installed within the passenger seat 102. The occupant detection sensors 42-46 can be installed into other portions of the vehicle 12, including other seats of the vehicle 12. For example, one or more occupant detection sensors (including any number of biometric sensors) can be installed in the driver seat 104 and/or the back seat(s) 106 (FIG. 2), which can be a bench seat with a seating capacity of more than one, for example.

The biometric sensors 42-44 may take on various forms. The biometric sensors can be sensors that detect the electrical signals associated with the heart or the neural system (e.g., Freer or Plessey sensors), sensors that detect motion associated with the body (e.g., breathing sensors, heartbeat sensors), or sensors that are electric field (capacitive) sensors that detect the occupant presence by a change in the capacitance of the system or sensor. Also, the sensors can be either passive or active. For example, the sensors that detect the motion associated with the body can be passive (e.g., piezoelectric) or active (e.g., electromagnetic, acoustic). The time of flight measurement applies to these active sensors and can be used for detecting presence of an occupant. Also, in general, a phase delay between transmitted and reflected signals (which includes both the time and frequency) can be used in detecting presence of an occupant. According to various embodiments, the biometric sensors 42-44 can be electrocardiogram (EKG) sensors, electroencephalogram (EEG) sensors such as a Freer neuro monitor based sensor, electromyography (EMG) sensors, and/or sensors that may detect other physiological characteristics including, but not limited to, piezoelectric sensors that may detect micro motions associated with breathing activity or a heartbeat and ultrahigh impedance sensors such as Plessy Epic sensors that may be configured to detect breathing, heart rate, and the like. The biometric sensors can have a sensor detection range that includes an area in which an occupant sits when properly sitting within the vehicle seat.

In one embodiment, the onboard sensor data obtained by the biometric sensors 42-44 can be processed using occupant detection sensor parameters in order to determine whether the onboard sensor data indicates the presence of an occupant and/or to determine an occupant presence classification. The occupant detection sensor parameters can be developed through an empirical process in which certain occupant detection sensor data is obtained for a variety of different scenarios (e.g., individual directly on the seat, a child in a child restraint on the seat, no individual in the seat) and then analyzed to extract or otherwise determine occupant detection sensor parameters that can be used to determine an occupant presence classification. For example, the occupant detection sensor data can include information pertaining to certain sensor response patterns that indicate the presence of certain scenarios, such as a child restraint being present, the occupant is a child, the occupant is an adult, the occupant is directly on the seat, etc. This data that is collected through the empirical process is referred to herein as empirical data.

Figure 2:
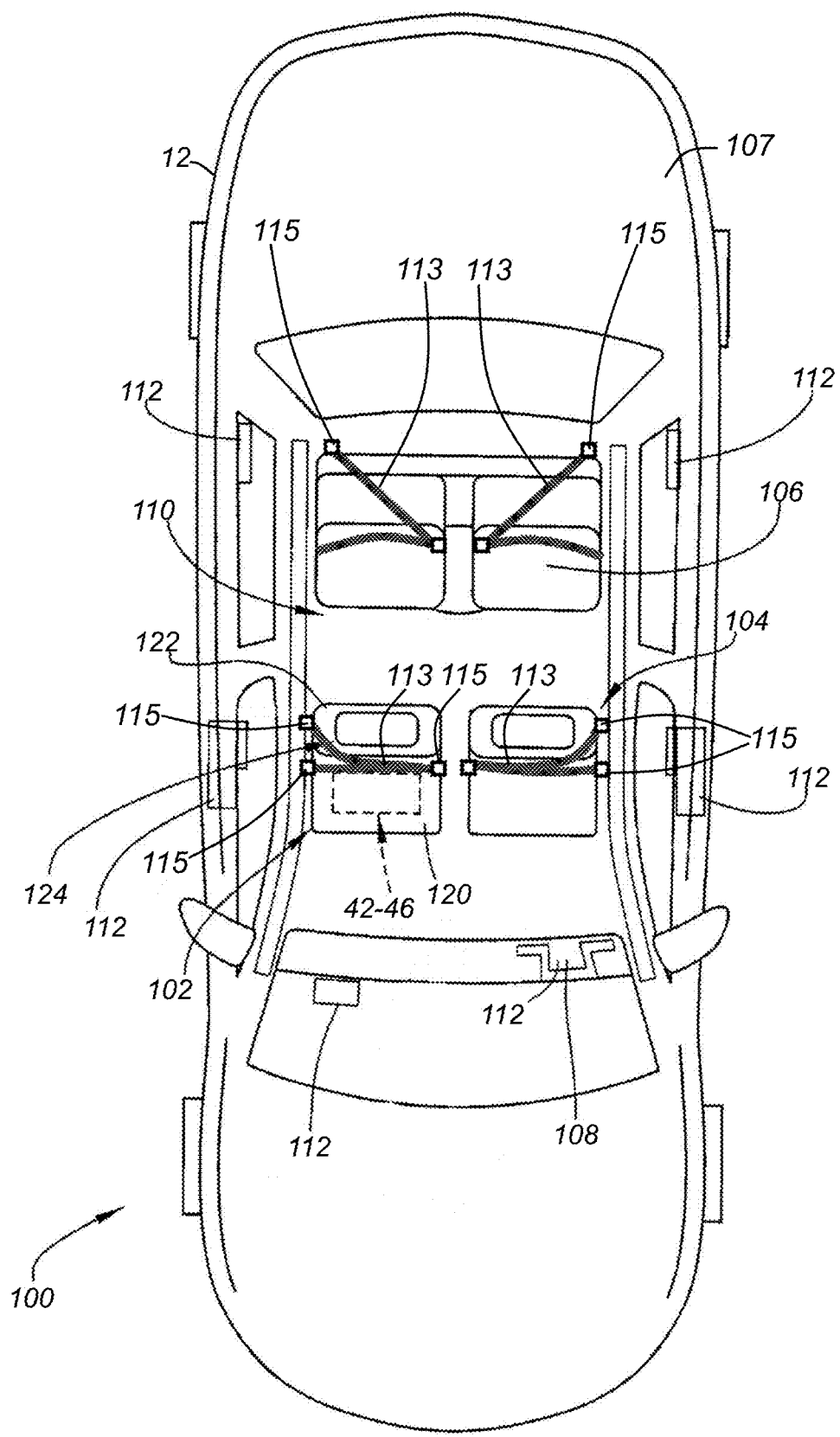
FIG. 2 is a top-view block diagram of the vehicle of FIG. 1 according to one embodiment.

The pressure sensor 46 is a non-biometric sensor that can be installed within a base portion 120 of the passenger seat 102 (FIG. 2). At least according to one embodiment, the pressure sensors 46 can detect an amount or degree of pressure due to the presence of one or more objects on the base portion 120. In one embodiment, the pressure sensor 46 can be omitted; however, in some embodiments, the pressure sensors 46 can be included in addition to one or more biometric sensors 42-44.

Additionally, the vehicle 12 can include other sensors not mentioned above, including cameras, wheel speed sensors, yaw rate sensors, orientation or force sensors (e.g., accelerometers), parking sensors, lane change and/or blind spot sensors, lane assist sensors, ranging sensors (i.e., sensors used to detect the range between the vehicle and another object, such as through use of radar or lidar), security- or theft-related sensors, other radars, other lidars, tire-pressure sensors, fluid level sensors (e.g., a fuel or gas level sensor, a windshield wiper fluid level sensor), brake pad wear sensors, V2V communication unit (which may be integrated into an infotainment module or the telematics unit 36), rain or precipitation sensors (e.g., infrared light sensor(s) directed toward the windshield (or other window of the vehicle 12) to detect rain or other precipitation based on the amount of reflected light), and interior or exterior temperature sensors.

The vehicle electronics 20 also includes a number of vehicle-user interfaces that provide vehicle occupants with a means of providing and/or receiving information, including the visual display 50, pushbutton(s), microphone(s) 52, and the audio system 48. As used herein, the term "vehicle-user interface" broadly includes any suitable form of electronic device, including both hardware and software components, which is located on the vehicle and enables a vehicle user to communicate with or through a component of the vehicle.

Audio system 48 provides audio output to a vehicle occupant and can be a dedicated, stand-alone system or part of the primary vehicle audio system. According to the particular embodiment shown here, audio system 48 is operatively coupled to both vehicle bus 40 and an entertainment bus (not shown) and can provide AM, FM and satellite radio, CD, DVD and other multimedia functionality. This functionality can be provided in conjunction with or independent of an infotainment module. The microphone(s) 52 provide audio input to the vehicle electronics 20 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 can be a graphics display and can be used to provide a multitude of input and output functions. Display 50 can be a touch screen on the instrument panel, a heads-up display reflected off of the windshield, or a projector that can project graphics for viewing by a vehicle occupant. The vehicle-user interfaces can be used to provide occupant presence status information to the vehicle user, which can be information that indicates the present and/or the occupant presence classification of one or more vehicle seats of the vehicle. Various other human-machine interfaces for providing input from a human to the vehicle as the interfaces of FIG. 1 are only an example of one particular implementation.

The occupant detection system 100 can include any one or more components of the vehicle electronics 20, including the occupant detection sensors 42-46 and the onboard computer 30. The occupant detection system 100 can further include other components, such as the BCM 24, the vehicle-user interfaces, the ECM 26, the telematics unit 36, etc. The occupant detection system 100 can be used to carry out one or more embodiments of the method discussed below, as well as other related functionality, for example.

With reference to FIG. 2, there is shown a top-view of an embodiment of the vehicle 12, including the occupant detection system 100 and the vehicle cabin 110. The vehicle cabin 110 includes one or more vehicle seats 102-106. For example, as shown in FIG. 2, the vehicle cabin 110 includes a front passenger seat 102, a driver seat 104, and a plurality of back seat(s) 106. The driver seat 104 can be located near a driving wheel or controls 108, the passenger seat 106 can be located next to the driver seat 104, and the back seat(s) 106 can be located behind the driver seat 104 and the passenger seat 102. In one embodiment, each of the seats can be associated with at least one or more airbags and seatbelt pretensioners that are provided for purposes of protecting an occupant within the associated seat. For example, the airbags 112 are illustrated in FIG. 2 at various locations, including within or at the driving wheel or controls 108, in the dashboard in front of the passenger seat 102, and to the sides of the driver seat 104, the passenger seat 102, and the back seat(s) 106. Seatbelts 113 with pretensioners 115 are also illustrated in FIG. 2 at various locations with components either mounted to seats 102-106 or the vehicle body 107. The following description and embodiments are described with respect to the passenger seat 102; however, these features can be applied to other vehicle seats, including the driver seat 104 and the back seat(s) 106, as well as other vehicle seats that may be included within a vehicle that are not explicitly described herein.

Figure 3:
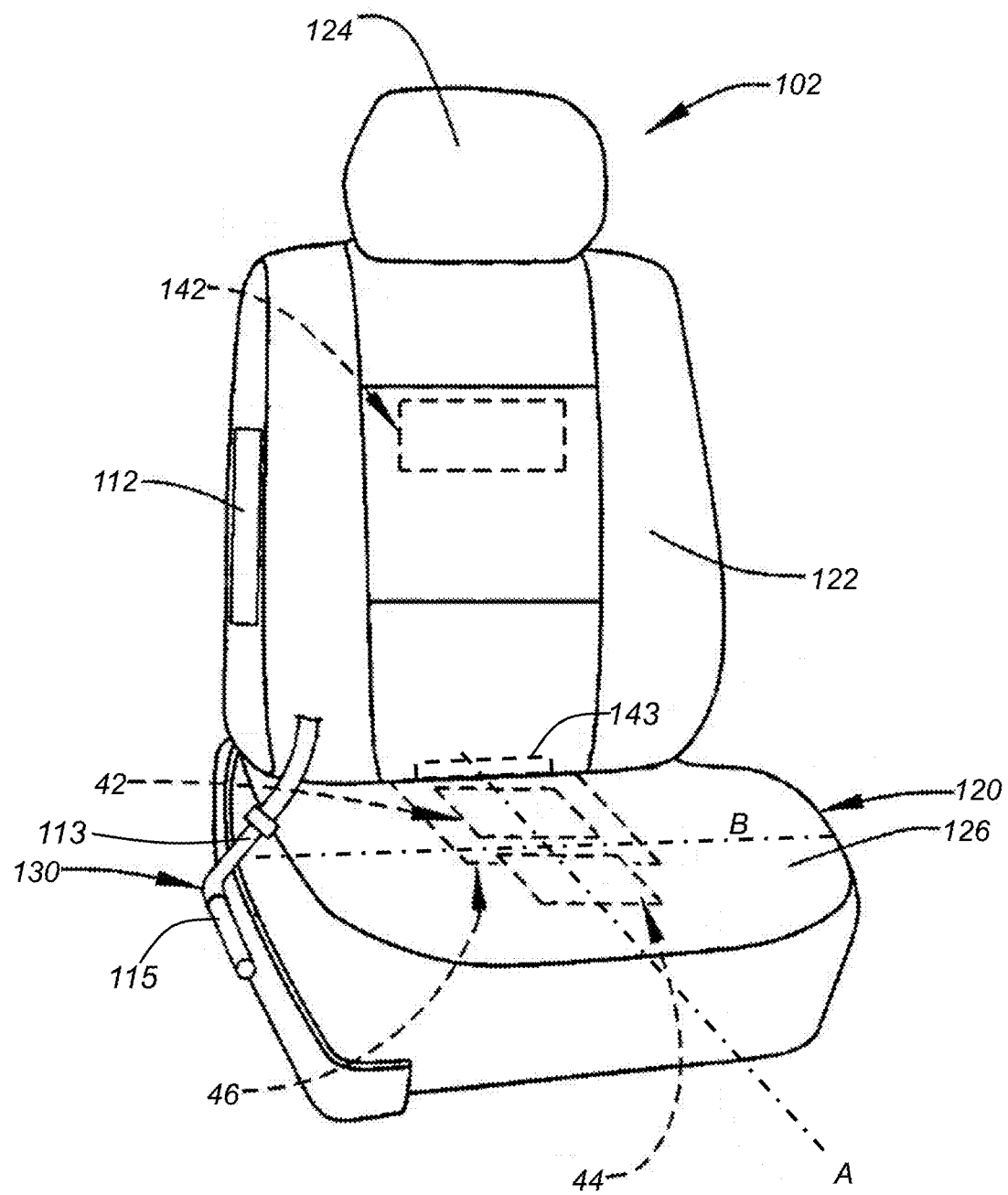
FIG. 3 is a perspective view of a seat of the vehicle of FIG. 2 according to one embodiment.

With reference to FIG. 3, there is shown a perspective view of the passenger seat 102 of FIG. 2. The passenger seats 102 includes a base or seat portion 120 (referred to herein as "base portion"), an upright or back portion 122 (referred to herein as "back portion"), and a head restraint 124. In some embodiments, the head restraint 124 can be omitted or may be integrated with the back portion 122. The passenger seat 102 can also include an occupant restraint device 130, such as a seatbelt 113 with a pretensioner 115. Also, in some embodiments, including the illustrated embodiment, an airbag 112 can be present within a portion of the seat, such as within the back portion 122. The base portion 120 includes a top portion or surface 126 (referred to herein as "top surface") on which the passenger sits when seated on the passenger seat 102.

The occupant detection sensors 42-46 can be integrated within the passenger seat 102, such as within the cushioning, below the cushioning, within the suspension, below the suspension, within the structure, and below the structure of the passenger seat 102. For example, with reference to the illustrated embodiment, the first biometric sensor 42 and the second biometric sensor 44 are integrated within the base portion 120. For example, one or more of the biometric sensors 42-44 can be positioned in the seat 102 such that, when a child restraint is placed on the top surface 126 of the base portion 120 of the seat 102, the child restraint is disposed between the biometric sensor(s) 42-44 and an occupant seating location within the child restraint (i.e., a location in which an occupant sits when properly within the child restraint). Also, the pressure sensor 46 is integrated within the base portion 120 of the passenger seat 102. In another embodiment, any one or more of the occupant detection sensors 42-46 can be integrated into another portion of the passenger seat 102, such as within the back portion 122 as shown at alternative sensor location 142 or within the opening between the base portion 120 and the back portion 122 as shown at alternative sensor location 143. Moreover, in other embodiments, the occupant detections sensors 42-46 can be installed into another component of the vehicle 12. For example, occupant detection sensors 42-46 can be installed into the dashboard of the vehicle 12. As mentioned above, the passenger seat 102 can include any number of occupant detection sensors, including any number of biometric sensors and/or pressure sensors, as the illustrated embodiment is just one example.

In at least one embodiment, the occupant detection system 100 can classify occupant presence as: (1) no occupant present ("occupant not present classification"); (2) occupant present but not directly on the seat ("occupant spaced away from seat classification"); and (3) occupant present directly on the seat ("occupant directly on seat classification"). In one embodiment, onboard sensor data from the one or more biometric sensors 42-44 along with the occupant detection sensor parameters are used to classify the occupant presence. In one scenario, the pressure sensor 46 may indicate that an inanimate object, such as a purse or an unoccupied child restraint, is present within the passenger seat 102 or may indicate that nothing is present, and the biometric sensors 42-44 may detect that no occupant is present. Thus, the occupant detection system 100 can classify the occupant presence of the passenger seat 102 as (1) occupant not present classification. The occupant detection system 100 may classify the occupant presence of the passenger seat 102 as (2) occupant spaced away from seat classification when an occupant is detected within the vehicle seat, but not directly on the seat, such as may be the case when a child is seated in a child restraint (e.g., car seat, booster seat, child restraint seat, infant carrier, infant seat, child bed, infant bed) on the passenger seat 102.

Figure 4:
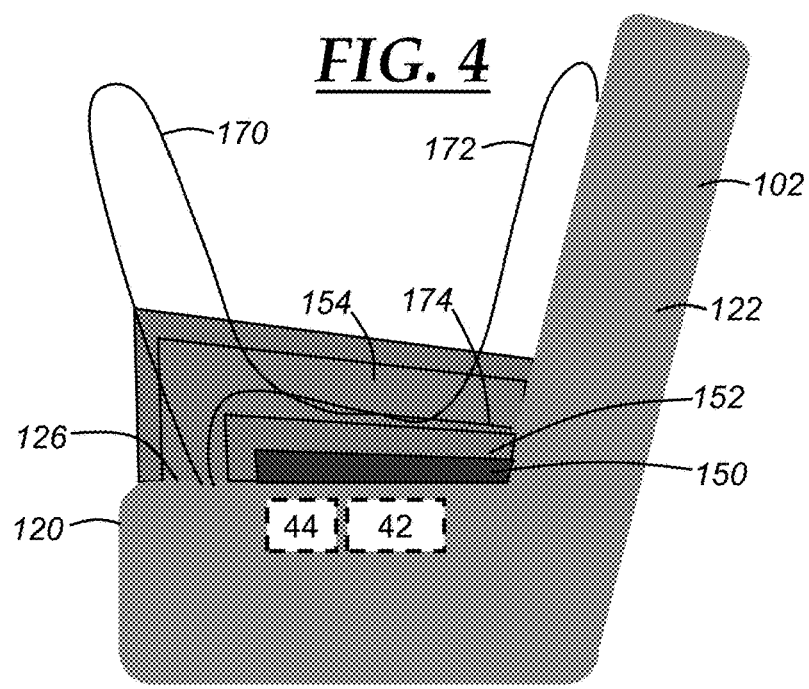
FIG. 4 is a cross-section view of the vehicle seat of FIG. 3 taken along line A.
Figure 5:
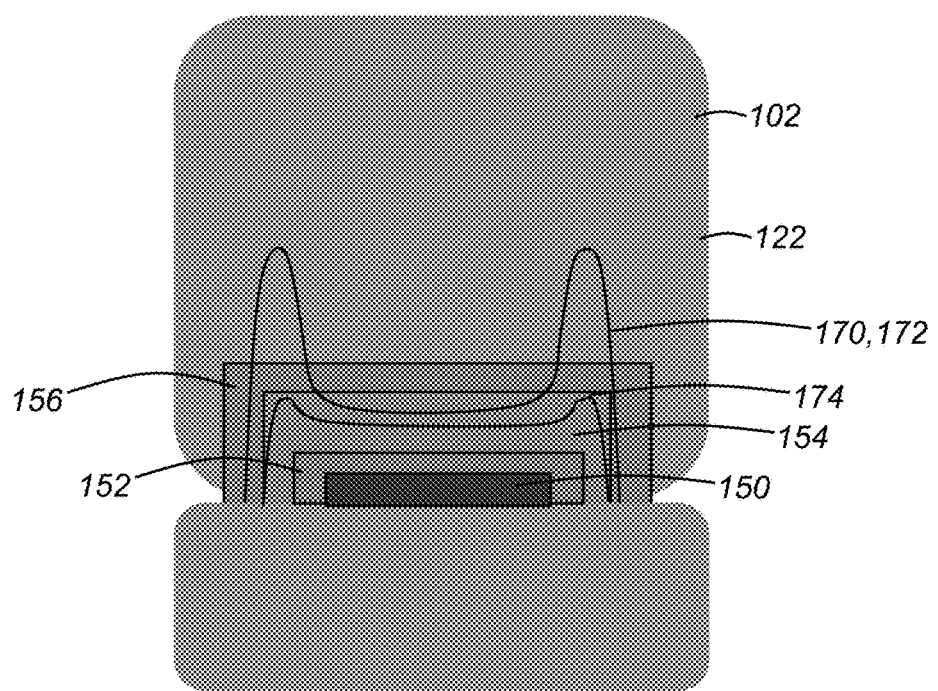
FIG. 5 is a cross-section view of the vehicle seat of FIG. 3 taken along line B.

With reference to FIGS. 4-5, cross-sectional views of the passenger seat 102 is shown. FIG. 4 depicts a cross-sectional view of the passenger seat 102 as taken along slice line (or centerline) A of FIG. 3 and FIG. 5 depicts a cross-sectional view of the passenger seat 102 as taken along a lateral slice line B of FIG. 3. According to at least one embodiment, the occupant detection system 100 uses a range finding approach to resolve the presence of an occupant be resolved to one or more zones with respect to the passenger seat 102. The range finding approach can determine a time of flight of sensor signals transmitted by the occupant detection sensor. For example, when using an electromagnetic or acoustic sensor, the amount of time between transmitting sensor signals and receiving a sensor response can be determined. This sensor signal flight time can then be used with other information, such as the speed of light (for electromagnetic signals) or the speed of sound (for acoustic signals), to determine a distance or range of the detected object/occupant and the occupant detection sensor. The detected range and other properties of the sensor response (or onboard sensor data) can be used along with occupant detection sensor parameters to determine a zone in which the occupant (or object) was detected. Likewise, the range finding approach can use (in another embodiment) signal strength of the detected signals to determine the distance since (for some sensors) the signal strength is commensurate to proximity.

These one or more zones can be associated with a particular the occupant presence classification, as discussed above. In one embodiment, such as shown in FIGS. 4 and 5, the occupant detection system 100 employs both the first biometric sensor 42 and the second biometric sensor 44 for purposes of determining an occupant presence classification and/or resolving the zone(s) in which the occupant is located. A first zone 150 is located directly on the top surface 126 of the base portion 120. The first zone 150 can also extend slightly into the base portion to account for seat bottom deflection when a person sitting on the seat compresses the seating surface (not shown). In the illustrated embodiment, the first zone 150 extends out from the back portion 122 for a majority of the length of the top surface 126 (see FIG. 4), and is centered with respect to a centerline A (see FIG. 5). The first zone 150 in the illustrated embodiment does not extend to the outer (or side) periphery of the passenger seat 102, as shown in FIG. 5. In one embodiment, the first zone 150 can be associated with the following classification: (3) occupant directly on seat classification. With this classification the detected occupant will likely also be present at the second zone 154 location, however the time of flight and strength of the signal will be determined from the closest occupant body part which is in the first zone 150. The first zone 150 is sized so that a child in a child restraint is not detected if they dangle their arms off the side of the child restraint or if they dangle their legs off the front of the child restraint and position their feet on the edge of the vehicle seat. A second zone 154 is disposed over the first zone 150, as shown in FIGS. 4-5. In another embodiment, the second zone 154 is also disposed in front of the first zone 150 (as shown in FIG. 4), and to the sides of the first zone 150 (as shown in FIG. 5). These extensions to the front and side of the first zone 150 enable detection of dangled legs and arms of a child in a child restraint. In one embodiment, when an occupant is only detected in the second zone 154 and not the first zone 150, then the occupant's presence can be classified as (or the occupant presence classification is): (2) occupant spaced away from seat classification. As shown in FIGS. 4-5, in one embodiment, a first gray zone 152 can be located between the first zone 150 and the second zone 154, and a second gray zone 156 is disposed above and surrounding the upper-most/outer-most portions of the second zone 154. This first gray zone 152 includes a region in which it may be unclear as to whether the biometric sensor 42 and the second biometric sensor 44 that detects an occupant in the second zone 154 also detects if that occupant is also present in the first zone 150. Also, the second gray zone 156 includes a region in which it may be unclear as to whether an occupant is present in the second zone 154. When an occupant is not detected in both the first zone 150 or the second zone 154, then the occupant's presence can be classified as (or the occupant presence classification is): (1) occupant not present classification.

As mentioned, the occupant's presence can be resolved to the first zone 150, the second zone 154, or neither. In one embodiment, each of the biometric sensors 42-44 may take on various forms including, but not limited to, electrocardiogram (EKG) sensors, electroencephalogram (EEG) sensors such as a Freer neuro monitor based sensor, electromyography (EMG) sensors, and/or sensors that may detect other physiological characteristics including, but not limited to, piezo electric sensors that may detect micro motions associated with breathing activity or a heartbeat and ultra-high impedance sensors such as Plessy Epic sensors that may be configured to detect breathing, heart rate and the like. All of these sensors detect responses and some of these sensors transmit a signal that can be returned as a response. The response can then be processed to resolve the occupant's presence to one or more of the zones based on processing the onboard sensor data (obtained from biometric sensors 42-44) along with the occupant detection sensor parameters. In one embodiment, the biometric sensors (or other similar biometric sensors of a like vehicle) can be calibrated and/or operated so as to gather empirical data. This calibration (or empirical process) can be carried out using a variety of different scenarios, such as with various occupants, child restraints, and/or other objects within the seat so as to obtain sensor responses for each of a variety of scenarios. Then, the occupant detection sensor parameters can be extracted from this empirical data and used by the vehicle electronics 20 to determine an occupant presence classification. FIGS. 4-5 depict an outline of a backward-facing child restraint 170, a forward-facing child restraint 172, and a backless booster seat 174, which is also considered a child restraint. When a child (or occupant) is seated within the child restraint, the child is not located within the first zone 150, but only in the second zone 154. Empirical testing and other processes can be used to develop occupant detection sensor parameters that correspond to different types of child restraint and a variety of scenarios (e.g., child present in backless booster seat, child not present in backward-facing child restraint).

For example, responses of the biometric sensors 42-44 that are considered "strong" may be associated with the first zone 150 and responses of the biometric sensors 42-44 that are considered "weak" may be associated with the second zone 154. A strong response refers to a sensor response in which certain characteristics of the sensor response indicative of an occupant presence are considered strong or large provided the type of sensor and range of sensor values. A weak response refers to a sensor response in which certain characteristics of the sensor response indicative of an occupant presence are considered weak or small provided the type of sensor and range of sensor values. A negligible response refers to a sensor response in which certain characteristics of the sensor response indicative of an occupant presence are considered negligible or very weak, including instances in which there is no sensor response. An empirical process can be used to develop conditions that are usable to evaluate whether a sensor response is considered "strong," "weak," or "negligible". In one embodiment, a weak response can be when certain characteristics of the sensor response indicative of an occupant presence are below a first signal strength threshold value or above a first time of flight threshold value, which can be indicated or included as a part of the occupant detection sensor parameters. And, in one embodiment, a strong response can be when certain characteristics of the sensor response indicative of an occupant presence are above the first signal threshold value or above the first time of flight threshold value, which can be indicated or included as a part of the occupant detection sensor parameters. Finally, in one embodiment a negligible response can be when certain characteristic of the sensor response is below a second signal strength threshold value or above a second time of flight threshold value or no response is received. In this embodiment, when a negligible response is received (or a response less than a second signal strength threshold value or above a second time of flight threshold value or no time of flight return response is received), it may be determined that there is no occupant present in the passenger seat 102. According to one embodiment, the biometric sensors 42-44 are calibrated/tested to sense an individual on the top surface 126 or slightly above it (or below it) with a high magnitude of response strength or a short time of flight duration (e.g., corresponding to the first zone 150), sense an individual spaced away from the top surface 126 with a weak magnitude of response strength or a medium time of flight duration (or weak response) (e.g., corresponding to the second zone 154), and to not sense an individual if no individual is present within the first zone 150 or the second zone 154 with a negligible to non-existent magnitude of response strength or a long to nonexistent time of flight duration. Although the above description discusses using thresholds to determine the occupant presence classification, a variety of other approaches and types of processing can be used to determine the occupant presence classification. This information can be included as a part of the occupant detection sensor parameters, and may be developed through testing (e.g., carrying out an empirical process) as discussed above.

Figure 6:
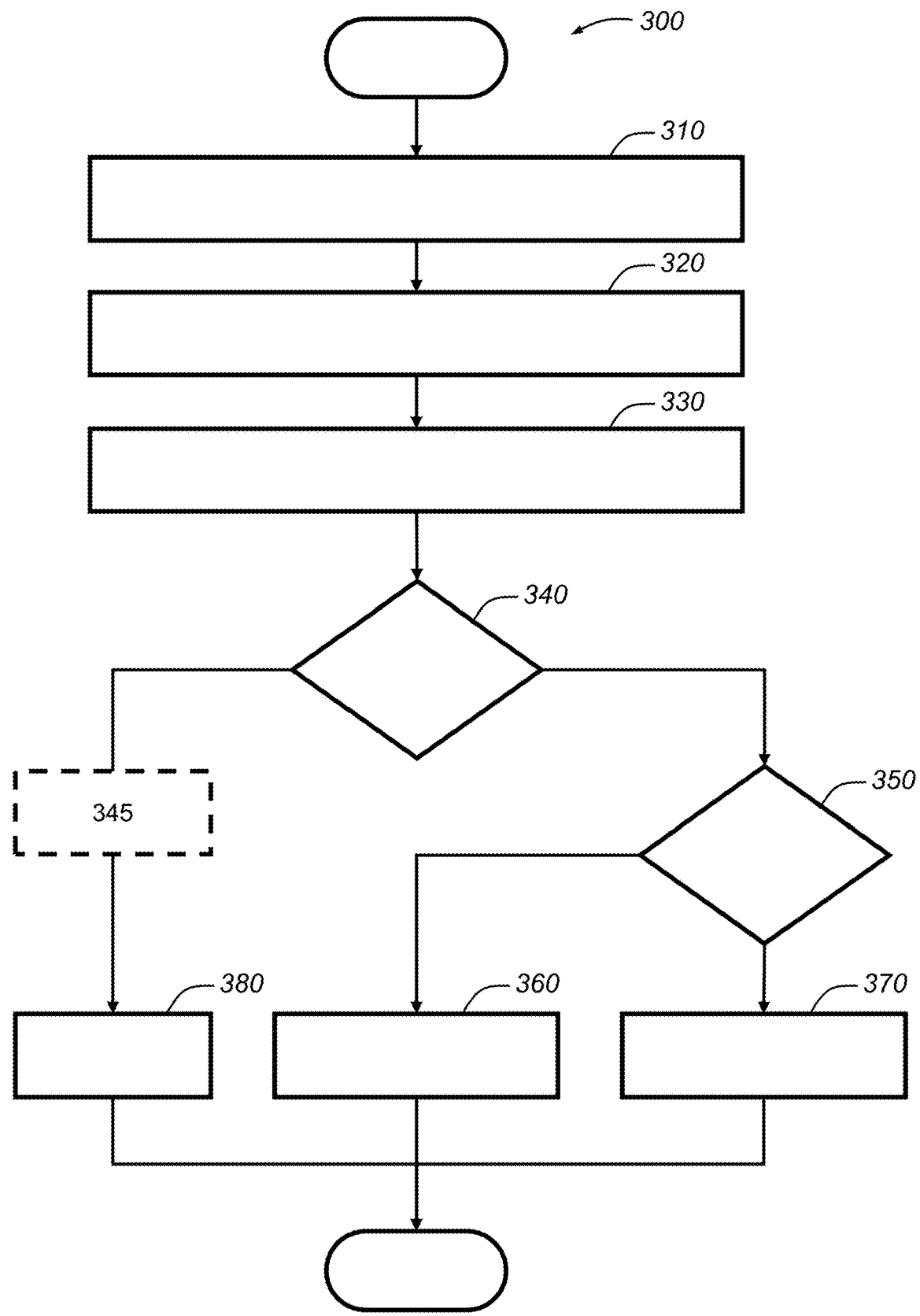
FIG. 6 is a flowchart of an embodiment of a method of detecting an occupant within a seat of a vehicle.

With reference to FIG. 6, there is shown a method 300 of detecting an occupant within a seat of a vehicle. In one embodiment, the method 300 (or any steps thereof) is carried out by the occupant detection system 100, which can include, for example, the onboard computer 30 and one or more of the occupant detection sensors 42-46, other onboard vehicle computer or computer system, other VSMs, and/or other vehicle electronics. Although the steps of the method 300 are described as being carried out in a particular order, it is hereby contemplated that the steps of the method 300 can be carried out in any suitable order as will be appreciated by those skilled in the art.

The method 300 begins with step 310, wherein an occupant detection system initiation signal is received. The occupant detection system initiation signal is any signal that indicates to begin occupant detection of a seat within the vehicle cabin. One example of an occupant detection system initiation signal is a signal indicating that the vehicle has transitioned from a primary propulsion off state to a primary propulsion on state, such as when the vehicle ignition is started. This signal can be received from the BCM 24 or the ECM 26, for example. Another example of an occupant detection system initiation signal is a signal indicating that the vehicle has begun moving or that the vehicle has come to a stop, which can be detected by the GNSS receiver 22 and/or various vehicle sensors, such as wheel speed sensors. And, another example of an occupant detection system initiation signal is a signal that indicates the vehicle is in the parked state, which can include a signal indicating that a parking brake is engaged or the vehicle is in a parking gear. The status of the vehicle doors can also be used in conjunction with one or more of these occupant detection system initiation signals to indicate to begin occupant detection of a seat within the vehicle cabin. Other occupant detection initiation signals can include the occupants initiating a ride function (such as by pressing a start ride button) or the vehicle receiving a door closed message once the vehicle doors have closed. The method 300 continues to step 320.

In step 320, the occupant detection sensors are powered on. In some embodiments, upon reaching step 320, one or more of the occupant sensors may already be powered on and, thus, in such scenarios, this step may be skipped, partially completed, or omitted. In one embodiment, the occupant detection sensors are provided power from a vehicle battery and initiated. The method 300 then continues to step 330.

In step 330, the occupant detection sensors obtain onboard sensor data. In one embodiment, the occupant detection sensors include only biometric sensors, such as sensors 42-44, and not any other occupant detection sensors (e.g., pressure sensor 46). However, in other embodiments, the occupant detection sensors can include other sensors, such as the pressure sensor 46. In one embodiment, at least one of the biometric sensors 42-44 obtains onboard sensor data via responses that match at least one of the following sensor types: electrocardiogram (EKG) sensors, electroencephalogram (EEG) sensors such as a Freer neuro monitor based sensor, electromyography (EMG) sensors, and/or sensors that may detect other physiological characteristics including, but not limited to, piezo electric sensors that may detect micro motions associated with breathing activity or a heartbeat and ultra-high impedance sensors such as Plessy Epic sensors that may be configured to detect breathing, heart rate and the like. All of these sensors detect signals associated with the presence of an occupant and some of these sensors transmit a signal that can be returned as a response. In at least one embodiment, the sensor response can be a reflection of the transmitted signal. In other embodiments, the biometric sensor can be passive and the presence of an occupant can be detected without transmitting an electromagnetic or acoustic signal from the biometric sensor. The sensor response can be sampled and/or otherwise processed. Also, in one embodiment, the sensor response can be stored in memory of the vehicle electronics 20, such as memory 34 of the onboard computer 30. The method 300 continues to step 340.

In step 340, the onboard sensor data is evaluated to determine whether an occupant is present. This step can be used to determine whether there is more than a negligible or non-existent signal present from a biometric sensor. The onboard sensor data can include all or part of the sensor response (or information based thereon). The onboard sensor data can be compared to the occupant detection sensor parameters or other predetermined information that can be used to evaluate the onboard sensor data in determining whether an occupant is present. In one embodiment, when the onboard sensor data meets certain threshold values or attributes (as indicated or provided by the occupant detection sensor parameters), then it can be determined that an occupant is present. When an occupant is detected (or determined to be detected), the method 300 continues to step 350; otherwise, when an occupant is not detected (or determined not to be detected), the method 300 continues to step 380. When an occupant is not detected, the occupant presence classification is the occupant not present classification.

In step 350, the onboard sensor data can be evaluated to determine an occupant presence classification. The occupant presence classification can include a plurality of classifications, including, for example, an occupant directly on seat classification and an occupant spaced away from seat classification. Certain occupant detection sensor parameters (e.g., which can include information pertaining to certain sensor response patterns) can be associated with a particular classification and the sensor response can be evaluated or compared with these occupant detection sensor parameters so that a classification can be determined. As mentioned above, in one embodiment, a strong sensor strength response or a short time of flight duration can be associated with the occupant directly on seat classification and a weak sensor strength response or a medium time of flight duration can be associated with the occupant spaced away from seat classification. Then, based on the occupant presence classification, appropriate action(s) can be taken, such as that which is illustrated in steps 360-370. In the illustrated embodiment, when the occupant presence classification is determined to be the occupant spaced away from seat classification (and/or a weak response is detected), the method continues to step 360 and, when the occupant presence classification is determined to be the occupant directly on seat classification (and/or a strong response is detected), the method 300 continues to step 370.

In steps 360-370, a vehicle action is taken based on the occupant presence classification. In the illustrated embodiment, upon reaching step 360, it is/was determined that an occupant is present in the seat and spaced away from the top surface of the seat; that is, the occupant presence classification is determined to be the occupant spaced away from seat classification. In one embodiment, in step 360, the vehicle action can be any of a variety of child restraint-related actions, including, for example: assessing a latch anchor usage, assessing seatbelt buckling or other restraint mechanism; assessing occupant and/or child restraint seatbelt routing; using a secondary occupant detection sensor to assess whether an occupant is present within a child restraint; further classifying the occupant based on other sensor information, including (for example) onboard sensor data from the pressure sensor 46; notifying a vehicle user of the presence of the occupant and/or of an improper system state (e.g., seatbelt not buckled, seatbelt routing is improper); disabling or suppressing at least one airbag or seatbelt pretensioner; and notifying a vehicle user of the presence of an occupant when it is determined that other occupant(s) are leaving the vehicle.

In the illustrated embodiment, upon reaching step 370, it is/was determined that an occupant is present in the seat and directly on the top surface of the seat; that is, the occupant presence classification is determined to be the occupant directly on seat classification. In one embodiment, in step 370, the vehicle action can be any of a variety of actions, including, for example: assessing seatbelt buckling or other restraint mechanism; assessing seatbelt routing; using a secondary occupant detection sensor to assess whether an occupant is present within the seat; further classifying the occupant based on other sensor information, including (for example) onboard sensor data from the pressure sensor 46; notifying a vehicle user of the presence of the occupant and/or of an improper system state (e.g., seatbelt not buckled, seatbelt routing is improper); and enabling, disabling, or suppressing at least one airbag or seatbelt pretensioner.

In the illustrated embodiment, upon reaching step 380, it is/was determined that an occupant is not present in the seat; that is, the occupant presence classification is determined to be the occupant not present classification. In one embodiment, in step 380, the vehicle action can be any of a variety of actions, including, for example: permitting the vehicle to move; disabling or suppressing at least one airbag or seatbelt pretensioner; detect objects within the seat using a second occupant detection sensor or other vehicle sensors; and notify a vehicle user of objects present or left in the seat when objects are detected to be in the seat. The method 300 then ends, or may be carried out again for repeated execution.

In one embodiment, a secondary occupant detection sensor can be used in addition to the biometric sensor(s) used in step 330 to obtain the onboard sensor data. In at least some embodiments, the secondary occupant detection sensor is not a biometric sensor and, in some embodiments, the secondary occupant detection sensor is another biometric sensor. The secondary occupant detection sensor can be the other one of the biometric sensors 42-44 (i.e., the biometric sensor not used in step 330 in cases in which both sensors are not used in step 330), the pressure sensor 46, a digital camera (e.g., a charge-coupled device (CCD), complementary metal-oxide-semiconductor (CMOS) camera), a radar or lidar, etc. As mentioned above, in one embodiment, a secondary occupant detection sensor can be used to obtain more information regarding the occupant and/or object(s) that are (or may be) within the seat. For example, when the occupant presence classification is determined to be the occupant not present classification, then a camera can be used to take images of the surrounding seat environment and then use image processing techniques to determine whether objects are present.

In one embodiment, the occupant detection sensors (including the biometric sensors 42-44 and/or the pressure sensor 46) can be powered on when the vehicle is in a primary propulsion on state. In one embodiment, the occupant detection sensors can monitor the status of an occupant (or absence thereof) while the vehicle is in the primary propulsion on state. In at least one embodiment, when the vehicle transitions from a primary propulsion on state to a primary propulsion off state, the occupant detection sensors can be powered off. In one embodiment, the occupant detection sensors can be periodically turned on (or activated) and then can obtain onboard sensor data (as well as any perform one or more of the steps of the method 300). After obtaining the onboard sensor data and/or processing the onboard sensor data, the sensors can then be turned off, and this process can be repeated.

Figure 7:
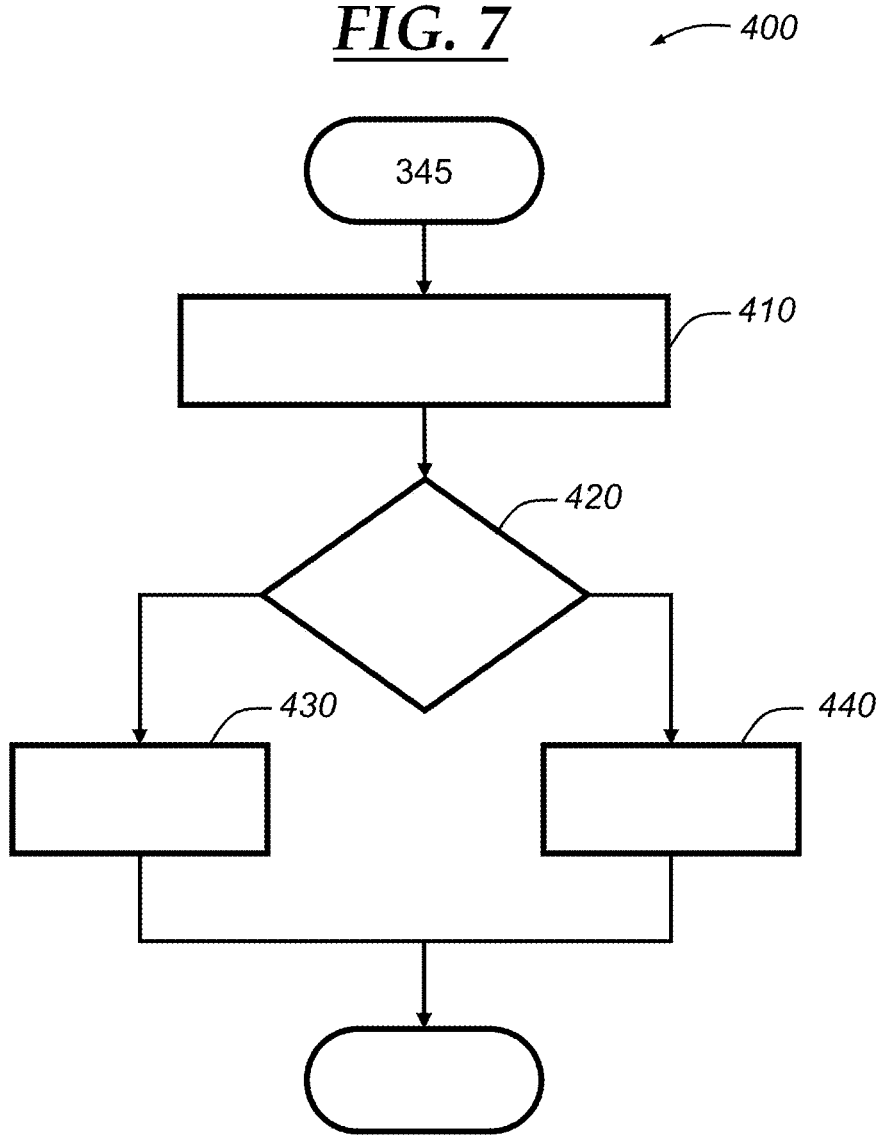
FIG. 7 is a flowchart of an embodiment of a process that can be used with the method of FIG. 6.

As mentioned above, when it is determined that an occupant is not present in the seat (or when no occupant is detected), the method continues to step 380. However, in other embodiments, when it is determined that an occupant is not present in the seat (or when no occupant is detected), the method can continue to step 345, which is illustrated as process 400 in FIG. 7. This step 345 can include: obtaining onboard sensor data using the pressure sensor 46 (step 410); and evaluating the obtained onboard sensor data to determine whether an object is present in the seat (step 420). This evaluation can include comparing the measured pressure (as indicated in the onboard sensor data from the pressure sensor 46) to a predetermined pressure threshold. When the measured pressure is above the predetermined pressure threshold, it can be determined that a large object is on the seat and the method can continue to step 430; otherwise, when the measured pressure is not above the predetermined pressure threshold, it can be determined that a large object is not present on the seat and the method can continue to step 440. In step 430, when a large object is detected on the seat, then a vehicle user can be warned or otherwise notified (e.g., via display 50 and/or audio system 48) that there are object(s) on the seat. In one embodiment, this notification may only be provided to the vehicle user when it is determined that the vehicle user is exiting the vehicle, such as through receiving a door opening/opened signal from or at the BCM 24. In another embodiment, this notification may be provided before the vehicle is enabled to move or during vehicle movement if an object is left on the seat or is placed on the seat while the vehicle is moving. Also, other appropriate vehicle actions can be taken, such as those discussed above with respect to step 380. The method 300 then ends, or may be carried out again for repeated execution.

Figure 8:
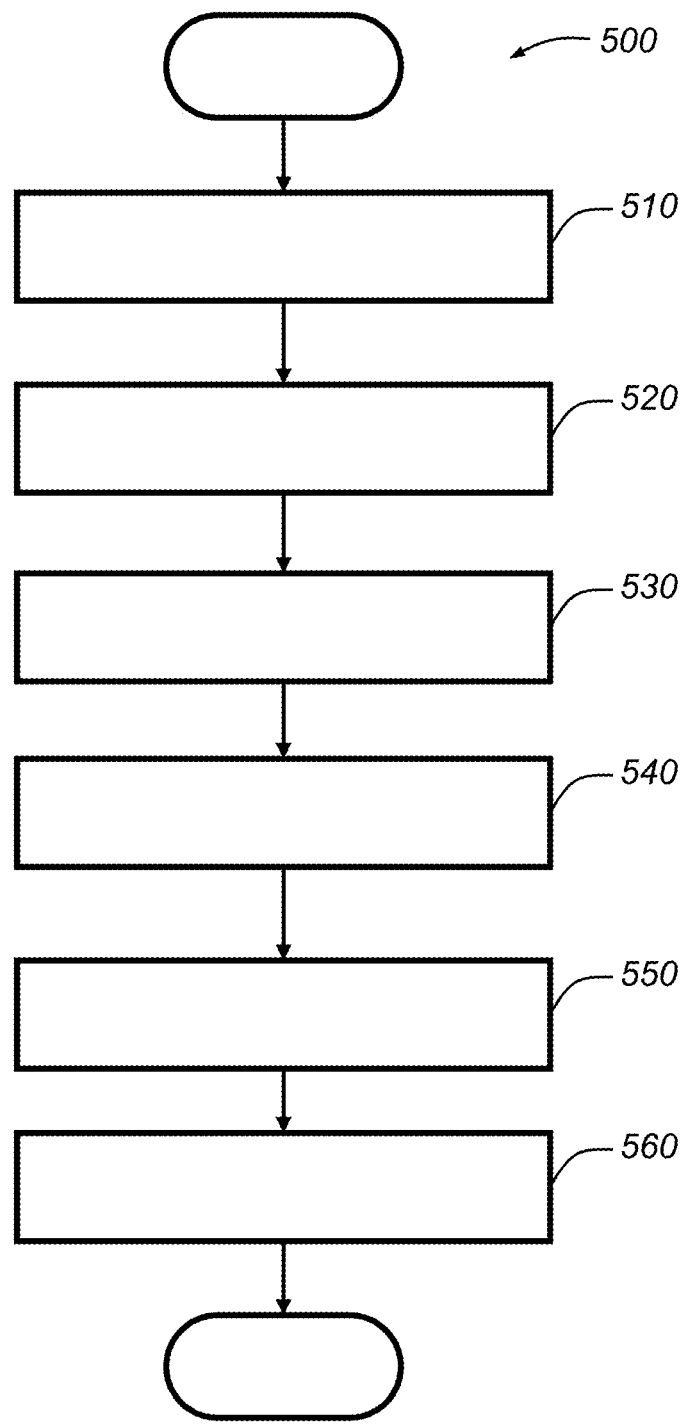
FIG. 8 is a flowchart of an embodiment of a remote status request process that can be used with the method of FIG. 6.

With reference to FIG. 8, there is shown a remote status request process 500 that can be used with the method 300. In one embodiment, the vehicle receives a status request (step 510) from a non-vehicle device (i.e., a device that is not a part of the vehicle electronics 20 (e.g., HWD 90)) that requests a status of the vehicle, such as the status or results of the occupant detection system. For example, the status request can be a remote status request that is received from the servers 82 of the backend facility 80 or remote server 78, via the telematics unit 36. Or, in another embodiment, the status request can be received from the HWD 90 via a SRWC connection. In yet another embodiment, the status request could be a programmed in periodic request initiated by the vehicle itself to monitor the seating positions. In response, in step 520, the vehicle 12 can power on the occupant detection sensor(s) 42-46 that will be used in obtaining onboard sensor data. In some embodiments, the occupant detection sensor(s) 42-46 may already be powered on and this step 520 can be omitted, such as in cases where the occupant detection sensors 42-46 are continually powered on. In step 530, onboard sensor data is obtained and an occupant presence classification is determined; this step can include or be similar to steps 330, 340, and/or 350, for example. In step 540, the occupant detection status is provided to the device that requested the occupant detection status (see step 510). This occupant detection status can include the occupant presence classification, as well as other information pertaining to the presence of an individual or object within the seat. In step 550, when an occupant is detected (or potentially not detected), then the device that requested the occupant detection status can provide a status message to the device. An option can be provided to the device user to contact the vehicle so that the user of the device (e.g., the HWD 90, the remote server 78, servers 82 of the backend facility 80) can contact the detected vehicle occupant. This option can be, for example, a voice call that is carried out using audio system 48 and microphone(s) 52. In step 560, the occupant detection sensors 42-46 can be powered off; in other embodiments, the occupant detection sensors 42-46 can be continuously on and this step may be omitted.

Figure 9:
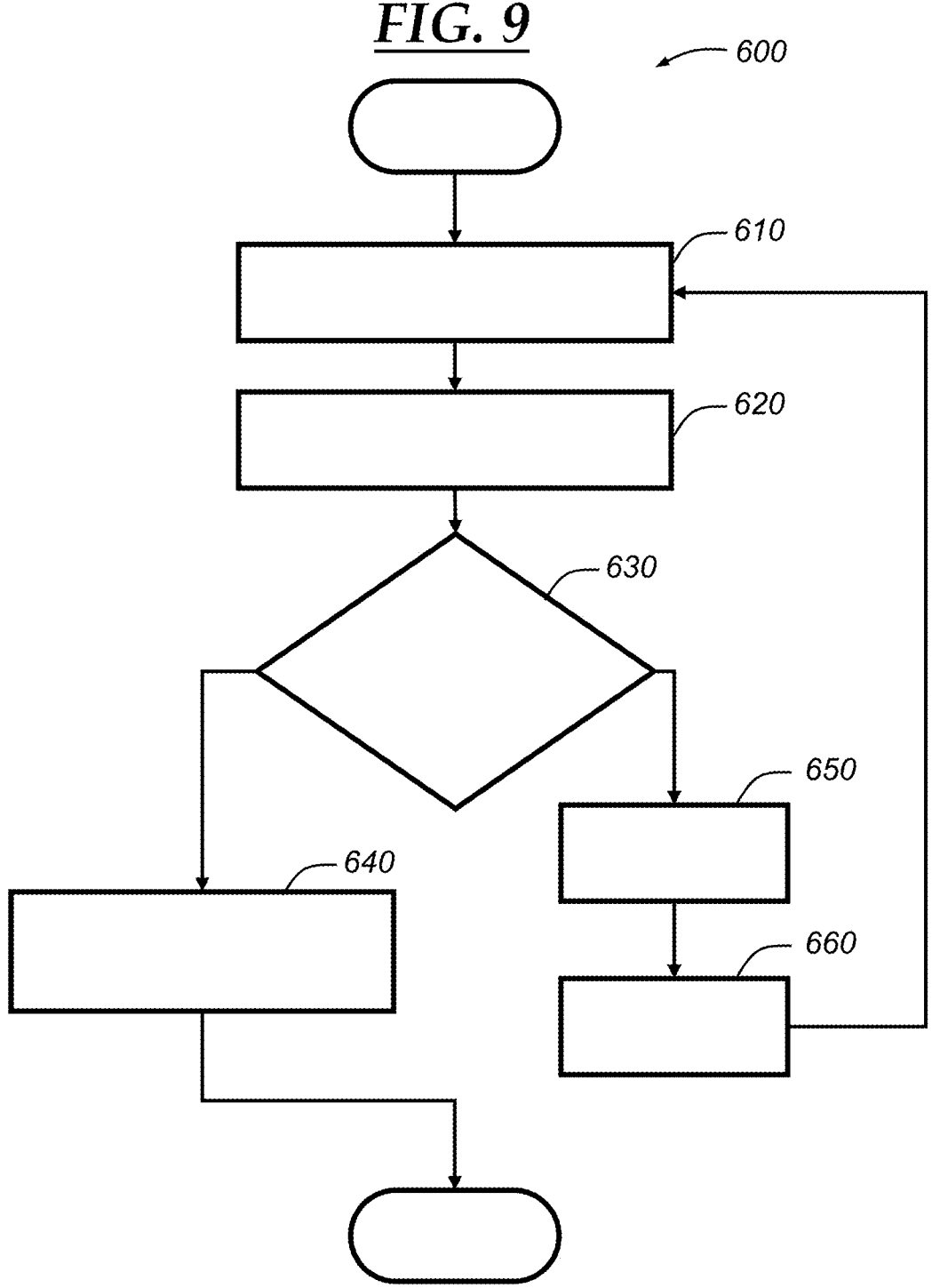
FIG. 9 is a flowchart of an embodiment of an intrusion detection process that can be used with the method of FIG. 6.

In one embodiment, the occupant detection system 100 and/or the method 300 can include carrying out an intrusion detection function or process, such as intrusion detection process 600 as illustrated in FIG. 9. In step 610, the vehicle 12 can power on the occupant detection sensor(s) 42-46. In some embodiments, the occupant detection sensors 42-46 may already be powered on and this step 610 can be omitted, such as in cases where the occupant detection sensors 42-46 are continually powered on. In one embodiment, the occupant detection sensors 42-46 are pulsed or continuously turned on to obtain onboard sensor data so as to continuously monitor the presence of an occupant/object in the seat. In another embodiment, a signal from a different sensor may trigger a power on command, such as from an accelerometer that detects some minimal motion or a noise sensor. Then, in step 620, the occupant detection sensors provide onboard sensor data. Then, in step 630, it is determined whether an occupant is detected in the vehicle that was not previously detected. In one embodiment, the onboard sensor data obtained from the biometric sensor(s) 42-44 and/or the pressure sensor 46 (or other secondary occupant detection sensors (e.g., a camera)) can be used along with presently obtained onboard sensor data to determine whether an occupant that was not previously detected is within the vehicle cabin 110 or a vehicle seat. When an occupant that was not previously detected is detected, the process 600 continues to step 650; otherwise, the process 600 continues to step 640.

In step 640, the process is repeated until the vehicle is placed into a primary propulsion on state or it is detected that a vehicle door is opened. In step 650, the vehicle is placed into in alarm state, which can include carrying out one or more security/notification functions, including activating an alarm (e.g., horns, other audio using audio system 48), contacting the police or other authorities (e.g., using the telematics unit 36), contacting a designated vehicle user, and/or carrying out other security/notification functionality. In one embodiment, after the vehicle carries out the one or more security/notification functions for a predetermined amount of time, then these functions can be deactivated (or terminated) (step 660) and then the process 600 can continue monitoring (i.e., carrying out the intrusion detection process again). The process 600 can be carried out multiple times and may include a waiting period between each iteration. At the start of the waiting period, the occupant detection sensors 42-46 can be powered off so as to conserve electrical power.

In one embodiment, the method 300, the process 400, the process 500, the process 600, and/or parts thereof can be implemented in one or more computer programs (or "applications", or "scripts") embodied in one or more computer readable mediums and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory of the vehicle 12 (e.g., memory 34), other vehicle memory, a combination thereof), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

What is claimed is:

1. A method of detecting an occupant within a seat of a vehicle, wherein the method comprises the steps of:
   obtaining onboard sensor data from both a pressure sensor and a biometric sensor onboard the vehicle;
   determining an occupant presence classification selected from a plurality of occupant presence classifications based on an evaluation of the onboard sensor data, wherein the evaluation is carried out using occupant detection sensor parameters in combination with the onboard sensor data, and wherein the plurality of occupant presence classifications include an occupant not present classification, an occupant spaced away from seat classification, and an occupant directly on seat classification, and wherein the occupant presence classification is assigned as one of the occupant present classification, the occupant spaced away from seat classification, or the occupant directly on seat classification based on the onboard sensor data obtained from both the pressure sensor and the biometric sensor; and
   carrying out a vehicle action in response to the determined occupant presence classification.

2. The method of claim 1, wherein the method further comprises: receiving an occupant detection system initiation signal, wherein the obtaining step is carried out in response to the receiving step, and wherein the occupant detection system initiation signal is at least one of (a) a signal indicating that the vehicle has transitioned from a primary propulsion off state to a primary propulsion on state, (b) a signal indicating that the vehicle is moving or has stopped moving or is in a parked state, (c) an occupant signal to initiate a ride, and (d) a door closed message.

3. The method of claim 1, wherein the biometric sensor is positioned in the seat such that, when a child restraint is placed on a top surface of a base portion of the seat, the child restraint is disposed between the biometric sensor and an occupant seating location within the child restraint.

4. The method of claim 1, wherein the obtaining step further comprises receiving a negligible response as the sensor response from the biometric sensor which indicates that an occupant is not present within the seat such that the occupant presence classification is determined as the occupant not present.

5. The method of claim 1, wherein the sensor response of the biometric sensor is considered a weak response indicates that an occupant is present within a child restraint on the seat such that the occupant presence classification is determined as the occupant spaced away from seat.

6. The method of claim 1, wherein the sensor response of the biometric sensor is considered a strong response indicates that an occupant is present directly on the seat surface such that the occupant presence classification is determined as the occupant directly on seat.

7. The method of claim 1, wherein the sensor response of the biometric sensor is evaluated by comparing the onboard sensor data to a first threshold, wherein the first threshold is obtained from the occupant detection sensor parameters, wherein the first threshold is used to distinguish between the weak response and a strong response, wherein it is determined that the occupant presence classification is the occupant spaced away from seat classification when the sensor response is determined as the weak response, and wherein it is determined that the occupant presence classification is the occupant directly on seat classification when the sensor response is determined as the strong response.

8. The method of claim 7, wherein the sensor response of the biometric sensor is evaluated by comparing the onboard sensor data to a second threshold, wherein the second threshold is obtained from the occupant detection sensor parameters, wherein the second threshold is used to distinguish between a negligible response and a weak response, wherein it is determined that the occupant presence classification is the occupant not present classification when the sensor response is determined as the negligible response, and wherein it is determined that the occupant presence classification is the occupant spaced away from seat classification when the sensor response is determined as the weak response.

9. The method of claim 1, wherein, when an object is detected in the seat and the occupant presence classification is determined as the occupant not present, then providing a warning via one or more vehicle-user interfaces.

10. The method of claim 1, wherein the biometric sensor is a piezoelectric sensor, a heartbeat sensor, or a breathing rate sensor.

11. The method of claim 1, wherein the biometric sensor is a Freer type sensor or a Plessey Epic sensor.

12. The method of claim 1, wherein an occupant status is provided to a non-vehicle device, and wherein the occupant status indicates the determined occupant presence classification.

13. The method of claim 1, wherein the method is carried out as a part of an intrusion detection process and, when an intruder is detected using the intrusion detection process, then notifying a designated vehicle user or law enforcement authority.

14. A method of detecting an occupant within a seat of a vehicle, wherein the method comprises the steps of:
- receiving an occupant detection system initiation signal with vehicle electronics of the vehicle;
- in response to receiving the occupant detection system initiation signal, obtaining onboard sensor data from at least one occupant detection sensor, wherein the at least one occupant detection sensor is a biometric sensor, and wherein the onboard sensor data includes data extracted from a sensor response of the biometric sensor;
- determining a zone of a plurality of zones with respect to the seat in which an occupant was detected based on analyzing the sensor response or onboard sensor data to determine a range of the sensor response, wherein the plurality of zones includes a first zone that is disposed directly on a top surface of a base portion of the seat and a second zone that is disposed over the first zone, and extending beyond the front zone past a front of the first zone and past opposing sides of the first zone, such that the first zone is disposed between the second zone and the top surface of the bottom portion of the seat;
- determining an occupant presence classification selected from a plurality of occupant presence classifications based on the determined zone, wherein the plurality of occupant presence classifications include an occupant not present classification, an occupant spaced away from seat classification, and an occupant directly on seat classification, wherein the occupant presence classification is determined as the occupant directly on seat when the determined zone is the first zone, wherein the occupant presence classification is determined as the occupant spaced away from seat when the determined zone is the second zone, and wherein the occupant presence is determined as the occupant not present when the occupant is not detected in either the first zone or the second zone; and
- carrying out a vehicle action in response to the determined occupant presence classification.

15. The method of claim 14, further comprising at least one of: communicating a message and taking a ride action as an outcome of the occupant presence classification.

16. An occupant detection system, comprising:
- a plurality of occupant detection sensors installed in a vehicle seat of a vehicle, wherein the plurality of occupant detection sensors include a pressure sensor and a biometric sensor, and wherein the sensor detection range of the biometric sensor includes an area in which an occupant resides when properly seated within the vehicle seat; and
- an onboard computer that includes a processor and memory, wherein the onboard computer is communicatively coupled to the plurality of occupant detection sensors, and wherein the memory includes occupant detection sensor parameters;

wherein the occupant detection system is configured to:
- obtain onboard sensor data from the plurality of occupant detection sensors, wherein the onboard sensor data includes data extracted from a sensor response of the biometric sensor;
- determine an occupant presence classification selected from a plurality of occupant presence classifications based on an evaluation of the onboard sensor data, wherein the evaluation is carried out using the occupant detection sensor parameters in combination with the onboard sensor data, and wherein the plurality of occupant presence classifications include an occupant not present classification, an occupant spaced away from seat classification, and an occupant directly on seat classification, and wherein the occupant presence classification is assigned as one of the occupant present classification, the occupant spaced away from seat classification, or the occupant directly on seat classification based on the onboard sensor data obtained from both the pressure sensor and the biometric sensor; and
- carry out a vehicle action in response to the determined occupant presence classification.

17. The method of claim 16, wherein the plurality of occupant detection sensors further include a second biometric sensor that is installed in the vehicle seat of the vehicle, and wherein the sensor detection range of the second biometric sensor includes an area in which an occupant resides when properly seated within the vehicle seat.

18. The method of claim 17, wherein the plurality of occupant detection sensors are installed within a bottom portion of the vehicle seat of the vehicle, and wherein the field of view of each of the plurality of occupant detection sensors are directed upward in a direction that is orthogonal to a top surface of the bottom portion of the vehicle seat.

19. The method of claim 9, wherein
- wherein the warning is provided as part of an alarm when an occupant that was not previously detected is now detected in a cabin of the vehicle, based on the onboard sensor data from both the pressure sensor and the biometric sensor onboard the vehicle.

20. The method of claim 14, wherein the determination of the occupant presence classification is further based on analysis of the onboard sensor data with respect to:
- a first gray zone located between the first zone and the second zone; and
- a second gray zone located above and surrounding uppermost and outermost portions of the second zone.

* * * * *